A. B. HERRICK.
CAR TESTING DEVICE.
APPLICATION FILED MAY 31, 1905.
905,875.
Patented Dec. 8, 1908.
3 SHEETS—SHEET 1.
Fig. 1,
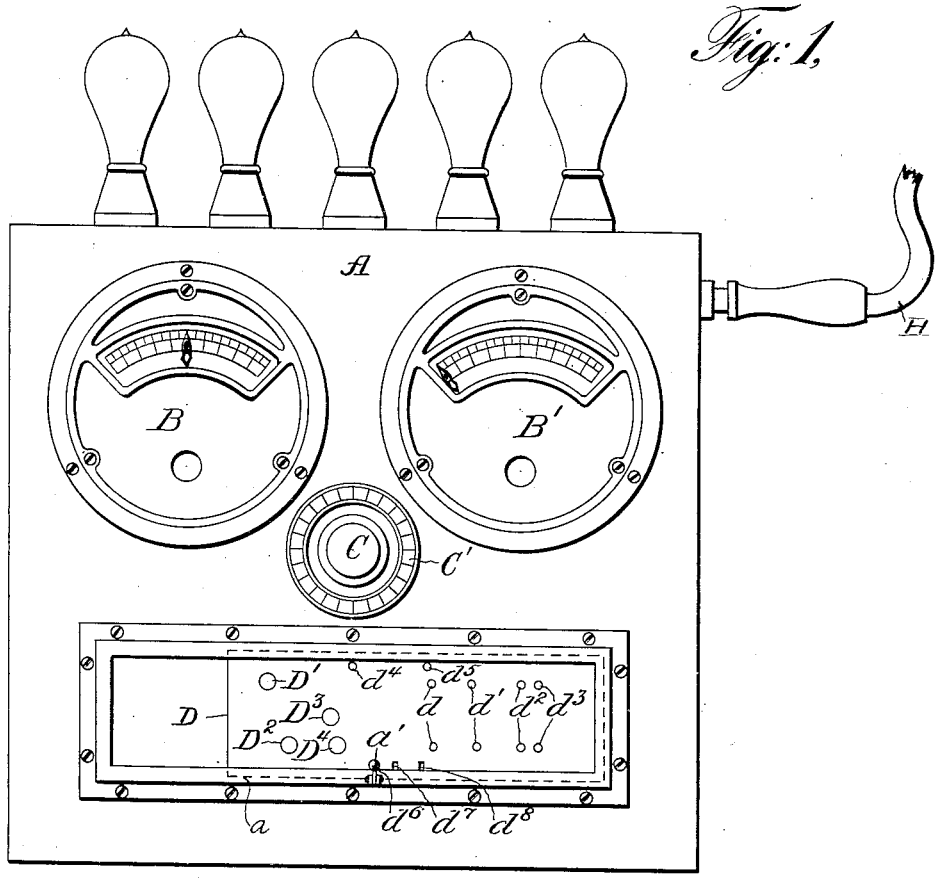
Fig. 2,
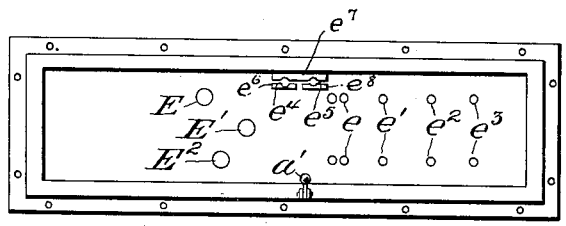
Witnesses
Max B. A. Doring.
G. W. Saywell
Inventor
Albert B. Herrick
By his Attorney
J. B. Fay.

A. B. HERRICK.
CAR TESTING DEVICE.
APPLICATION FILED MAY 31, 1905.
905,875.
Patented Dec. 8, 1908.
3 SHEETS—SHEET 2.
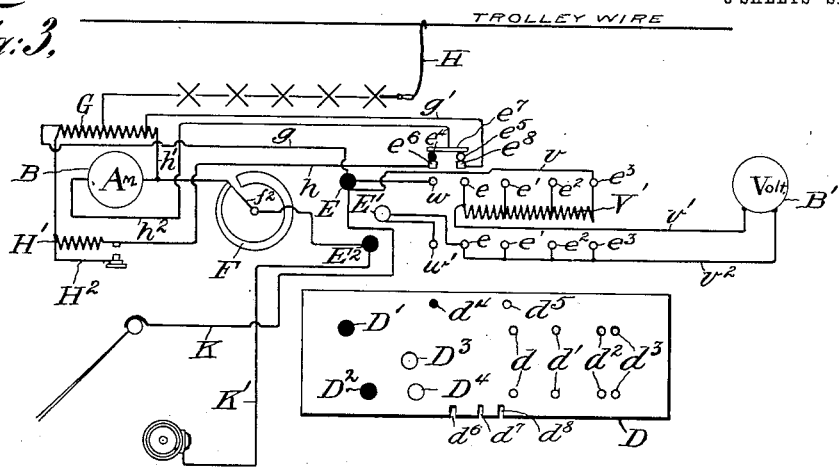
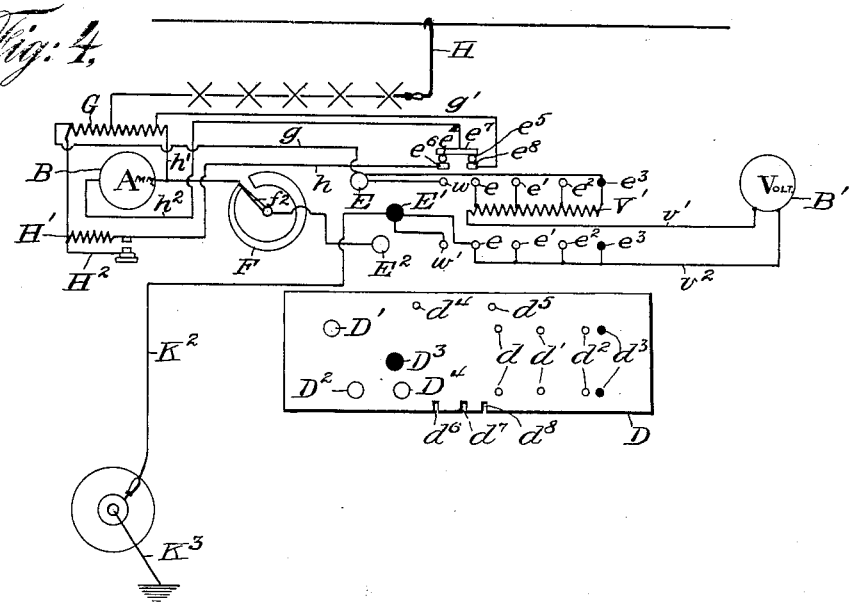
Witnesses
Max B. A. Doring.
S. W. Saywell
Inventor
Albert B. Herrick
By his Attorney
J. B. Fay.

A. B. HERRICK.
CAR TESTING DEVICE.
APPLICATION FILED MAY 31, 1905.

905,875.

Patented Dec. 8, 1908.

3 SHEETS—SHEET 3.

Witnesses
Max B. A. Doring.
G. W. Saywell

Inventor
Albert B. Herrick
By his Attorney
J. B. Fay

UNITED STATES PATENT OFFICE.

ALBERT B. HERRICK, OF RIDGEWOOD, NEW JERSEY.

CAR-TESTING DEVICE.

No. 905,875.  Specification of Letters Patent.  Patented Dec. 8, 1908.

Application filed May 31, 1905. Serial No. 263,177.

*To all whom it may concern:*

Be it known that I, ALBERT B. HERRICK, a citizen of the United States, resident of Ridgewood, county of Bergen, and State of New Jersey, have invented a new and useful Improvement in Car-Testing Devices, of which the following is a specification, the principle of the invention being herein explained and the best mode in which I have contemplated applying that principle, so as to distinguish it from other inventions.

My invention relates to devices for testing electrical apparatus, such as electric cars or the component parts thereof, its object being to provide an apparatus for effecting such tests accurately and economically.

A further object is to provide the apparatus with means whereby only the required connections can be made, thereby protecting its parts against injury as will further appear.

The said invention consists of means hereinafter fully described and particularly set forth in the claims.

The annexed drawings and the following description set forth in detail certain mechanism embodying the invention, the disclosed means, however, embodying but one of various forms in which the principle of the invention may be used.

Figure 5:
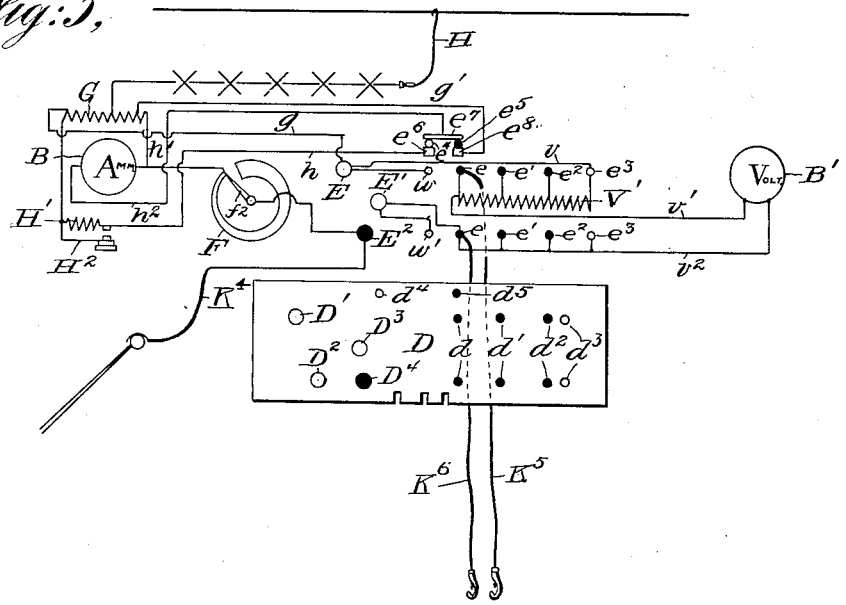
Figure 6:
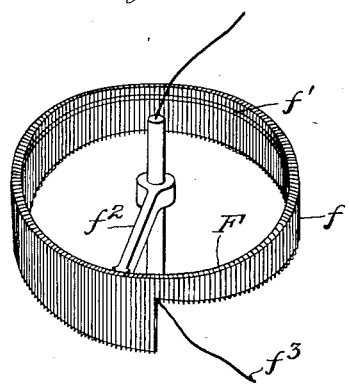

In said annexed drawings: Figure 1 represents a front elevation of an apparatus embodying my invention, the standards for supporting the device being omitted; Fig. 2 represents a portion of the face of the apparatus with the movable slide, hereinafter described, removed to disclose the location of the plug terminal openings; Figs. 3, 4 and 5 represent diagrammatic views of the connections in the apparatus, and parts of an electric car involved in certain tests; Fig. 6 represents a perspective view of a variable resistance and rheostat forming a part of my invention.

The frame or casing A which carries the various elements of the device is made portable, and preferably mounted upon suitable standards or legs (not shown). In the upper part of the casing are mounted an ammeter B and a voltmeter B'. Below the voltmeter and ammeter is located a knob C which is used for manually-actuating a variable resistance or rheostat which will be hereinafter described. Located on the face of the casing is a horizontal guideway $a$ in which slides a plate or slide D provided with a series of apertures or perforations D', D², D³, D⁴, $dd$, $d'd'$, $d^2d^2$, $d^3d^3$, $d^4d^5$, arranged in a manner hereinafter described. Exposed upon the face of the frame and behind the slide are a series of plug-apertures, E, E', E², $ee$, $e'e'$, $e^2e^2$ and $e^3e^3$, forming taps into the circuits of the device. Two sets of plug-terminals are also provided in the face of the casing forming terminal apertures $e^4$ and $e^5$ for receiving a plug adapted to complete the circuits at these points.

In order to illustrate the operation of this apparatus, I shall describe three characteristic tests made by means of this apparatus; for each of these tests there is a different position of the slide D and the latter is fixed in these various positions by means of any suitable locking-device.

In the drawing Fig. 1, I have shown the lower edge of the slide provided with three notches $d^6 d^7 d^8$, which are engaged by a lever $a'$, which may be provided with a suitable spring (not shown) for maintaining the engagement, as will hereinafter appear. Each position of the slide effects the registration of a certain number of plug-apertures with certain of the perforations in the slide, thereby allowing plugs to be inserted in such apertures, and preventing the insertion of the plugs in all of the others. The instrument is connected with a source of electrical current by means of a connection H. This source is usually the trolley wire, and the end of the connection H is provided with a suitable hook which may be caused to engage such wire, as indicated in the diagrams in Figs. 3, 4 and 5.

In Fig. 6 I have illustrated in detail the construction of the variable resistance operated by the knob C. This resistance is placed in the circuit in a manner hereinafter described and consists of a circular frame F of varying depth as shown, such depth being a minimum at given point as shown, and increasing successively so as to cause its maximum to be located contiguous to its minimum. Around this frame is wound a continuous conductor $f$ consisting of an insulated wire. The winding is carried out so as to form a series of contiguous convolutions, which, by reason of the above-described form of the frame, are of varying diameter, the latter increasing continuously from a minimum to a maximum diameter. The interior portion of the convolutions are cut away through the insulation so as to expose a portion of the wire of each convolution as indicated at $f'$, Fig. 6. A movable arm $f^2$ is arranged so as to permit its outer or free end to contact with these exposed portions of the wire, and this arm is made one terminal of the circuit, the end of the wire-winding forming the end of the convolution of smallest diameter forming the other terminal as $f^3$. This arm is connected with the knob C and it will therefore be seen that convolutions of the wire-conductor $f$ may be cut into and out of the circuit. By arranging the convolutions so as to have the varying diameters it will be seen that a greater number of contact points for a given length of the conductor is had at the end of smaller depth. This structure therefore enables the operator to vary the amount of resistance cut in or out of the circuit with greater nicety and in smaller parts when the one end of the resistance is in use, than when the other end thereof is in use. The value of this construction will appear in connection with one of the hereinafter-described tests.

In order to reduce the current below that of the trolley-wire, a bank of lamps is introduced into the circuit as shown in Fig. 1. These lamps are in series as shown and are connected with the middle point of a fixed resistance G. One end of this resistance is connected by means of a conductor $g$ with the tap or plug-aperture E, and the same end is also connected by means of a conductor $h$ with the terminal member $e^6$ which together with a bar $e^7$ forms the terminal aperture $e^4$. In this conductor is placed in series, a fixed resistance H', which may, however, be cut into or out of the circuit by means of a key $H^2$. The other end of the resistance G is connected by means of a conductor $g'$, with the terminal member $e^8$ which, with bar $e^7$ forms the terminal aperture $e^5$. This latter end of said resistance G is also connected by means of a conductor $h'$, with one terminal of the ammeter B, the other terminal of the latter being connected, by means of conductor $h^2$, with the bar $e^7$. The conductor $h'$ also connects with the terminal of the convolution of smallest diameter of the variable resistance F. The movable arm $f^2$ of said resistance is connected with the plug-aperture $E^2$. In series with a conductor $v$ connected with plug-aperture E is a fixed resistance V', and in the same series is the voltmeter V, one terminal of which is connected with said resistance by a conductor $v'$. The other terminal is connected with plug-aperture E' by means of a conductor $v^2$. Separate conductors connect plug apertures E and E' with two additional plug-apertures $w$ and $w'$, as shown. The series of plug apertures $e\,e$, $e'\,e'$, $e^2$, $e^2$ and $e^3\,e^3$ are connected with the voltmeter circuit as shown so as to allow an extraneous circuit to be formed in parallel with the voltmeter, for the purpose of certain tests, one of which is hereinafter described. It will be noted that by this arrangement the whole of the resistance V' or fractions thereof may be cut into or out of the circuit.

In the diagrammatic Figs. 3, 4 and 5, the slides are for convenience shown removed but vertically below their actual positions, so as not to obscure the plug and terminal apertures. Plug and terminal apertures in circuit are shown by solid black and those which are open are shown by plain circles.

Fig. 3 illustrates diagrammatically the connections for what is termed the "inspector's test" wherein the resistance of all of the electrical connections between the trolley and ground, are tested. In this test, the slide is moved over so as to bring slot $d^6$ into alinement with lever $a'$. In this position plug apertures E and $E^2$ are caused to register with apertures D' and $D^2$ of the slide. All other plug or terminal apertures excepting terminal aperture $e^4$, are covered and cannot therefore be plugged. An extraneous conductor K is plugged into aperture E and connected with the trolley wheel, the latter having been previously removed from the trolley wire. A second extraneous connection K' is plugged into aperture $E^2$ and is connected with one of the car wheels, as shown. A plug is inserted in terminal aperture $e^4$. With the connections made as described the voltmeter B' is cut out and is not used, and the ammeter becomes a galvanometer. Now by varying the resistance F by turning the knob C so as to introduce sufficient resistance to cause the needle of ammeter B to read zero, the current in the two parallel circuits formed by the connections, will balance each other. A suitable scale C' is provided for reading the amount of resistance introduced. Such reading hence indicates the general resistance of the car, when the ammeter pointer is at zero.

Fig. 4 represents the apparatus arranged for testing the insulation of the various portions of a circuit, such for instance, as that between a motor armature and its shaft, which latter in a car is commonly grounded through the motor frame and the wheels. With this arrangement, it is possible, by the use of a voltmeter and suitable connections, to ascertain generally whether there is an undue leakage through any given part of the circuit, and also to measure its resistance in megohms, as when it is desired to ascertain whether or not an insulation is of the designed standard. In order to ascertain generally, whether or not there is leakage between the armature and its shaft, the slide D is moved so as to enable lever $a'$ to interlock with slot $d^7$. This brings the aperture $D^3$ into alinement with the plug aperture E' and the apertures $d^3$ into alinement with the resistance plug apertures $e^3$, $e^3$. An extraneous conductor $K^2$ is now plugged into aperture E′, and its other end connected by suitable means with one armature terminal. The armature shaft or journal is now connected by another conductor K³ with the ground, as for instance the track rail. This puts resistance G, wire $g$, plug apertures E, $e^3$, resistance V′, voltmeter B′, wire $v^2$, plug E′, connection K², and the armature terminal in series. If now the insulation between the armature and the shaft be broken, the circuit to ground will be completed through the shaft and the conductor K³, causing a deflection of the voltmeter more or less according to the completeness of the circuit. To measure the resistance between the armature and the shaft in meg-ohms, the connections are changed so that the voltmeter is in a parallel circuit to the armature and its insulation, so that the greater the resistance of the armature insulation, the greater will be the drop between the voltmeter terminals and the greater the deflection, which as is obvious, can be calibrated to read in units of resistance, as meg-ohms. In order to do this, the connection with the armature terminal, instead of being from plug E′, will be from one of the resistance plugs $e^3$ as by K⁵ (Fig. 5), and from the other plug $e^3$ as by K⁶, (Fig. 5) a connection to ground will be made through the armature shaft or journal.

Fig. 5 illustrates the connections in the device when the latter is used for what is known as the "detail resistance test". In this test the slide is moved over so as to cause notch $d^8$ to come into alinement with the lever $a′$, and is locked in this position. An extraneous conductor is plugged into the aperture E² and is connected with the trolley wheel, as shown by K⁴. Extraneous conductors K⁵ and K⁶ may now be plugged into the resistance plug apertures $e$, $e′$, $e^2$ or $e^3$ through either the apertures $d$, $d′$ or $d^2$ as the conditions may require. The outer ends of these extraneous conductors are provided with suitable means for connecting them with the terminals of any part or the detail of the car which it is desired to measure for the resistance, so that the voltmeter will indicate the fall in potential between conductors K⁵, and K⁶, and thereby enable the resistance to be determined.

Other modes of applying the principle of my invention may be employed instead of one explained, change being made as regards the mechanism herein disclosed, provided the means stated by any one of the following claims or the equivalent of such stated means be employed.

I therefore particularly point out and distinctly claim as my invention:

1. In an electrical testing device, the combination of a frame; an electrical measuring device; a single variable resistance mounted upon said frame; electrical connections for such measuring device and resistances including a series of plug-terminals accessible from the front of the frame; and movable protecting plate provided with a series of apertures adapted to register with given plug-terminals and simultaneously obstruct others.

2. The combination with an electroresponsive device for indicating units of resistance and connections therefor, and fixed terminals adapted to be connected to said device and to the circuits to be tested, different terminals being used for different tests, of a terminal controlling device for rendering operable only the terminals required for the particular test to be performed, and removable outside terminals independent of the controlling device for engaging the fixed terminals as determined by the position of said controlling device, substantially as described.

3. The combination with instrumentalities for measuring the resistance of a circuit, and for measuring the insulation thereof, of separate normally covered terminals for connection with the circuit according to whether the resistance or the insulation is to be determined, outside coöperating terminals and means whereby only the terminals necessary to the measurement of the resistance or the insulation can be exposed at a time through said controlling device, substantially as described.

4. The combination with instrumentalities for measuring the resistance of a circuit, and for measuring the insulation thereof, of separate terminals for connection with the circuit according to whether the resistance or the insulation is to be determined, a single set of coöperating terminals, means whereby only the terminals necessary to the measurement of the resistance or the insulation can be used at a time, and means whereby the terminals not required to make one of said measurements are rendered inaccessible, substantially as described.

5. The combination with instrumentalities for measuring the resistance of a circuit, and for measuring the insulation thereof, of separate terminals for connection with the circuit according to whether the resistance or the insulation is to be determined, means whereby only the terminals necessary to the measurement of the resistance or the insulation can be exposed at a time, a set of outside terminals adapted to coöperate therewith, and means controlling said contacts whereby the terminals not required to make one of said measurements are rendered inaccessible, said controlling means having definite positions corresponding to the measurement to be made, substantially as described.

6. The combination with means for measuring the total resistance of a circuit, of means for measuring any portion thereof, terminals common to both tests, other interior terminals for each test, outside terminals adapted to be joined with said interior terminals, and a movable device having apertures permitting only the terminals for a definite test to be joined at one time.

7. The combination with connections for measuring the total resistance of a circuit by a galvanometer, of other connections including a voltmeter, and connections whereby the galvanometer measures the current in the circuit and the voltmeter measures the drop of potential in a portion of said circuit, and means preventing use of the voltmeter when the total resistance is being measured, substantially as described.

8. The combination with a galvanometer, a circuit, a variable resistance, and connections whereby the resistance of said circuit may be measured, of a voltmeter, and connections whereby said galvanometer measures the current in said circuit and the voltmeter indicates fall of potential in a portion thereof, whereby to determine the resistance of said portion, and means preventing use of the voltmeter when the galvanometer and the variable resistance are being used to measure resistance, substantially as described.

9. The combination with galvanometric connections and devices for measuring the resistance of a circuit, of means for measuring the resistance of a portion thereof by drop of potential therein, said latter measurement employing said galvanometer to indicate current strength, and means preventing use of the potential indicating means when the resistance of said circuit is being measured by said galvanometric means, substantially as described.

10. The combination with galvanometric connections and devices for measuring the resistance of a circuit, of means for measuring the resistance of a portion thereof by drop of potential therein, said latter measurement employing said galvanometer to indicate current strength, and means preventing use of the potential indicating means when the resistance of said circuit is being measured by said galvanometric means, and also preventing use of said galvanometric resistance measuring means when the fall in potential of a portion of said circuit is to be measured, substantially as described.

Signed by me, this 18th day of May 1905.
ALBERT B. HERRICK.

Attested by—
A. E. MERKEL,
MABEL O. FAHNESTOCK.